(12) United States Patent
Bertacchini et al.

(10) Patent No.: US 6,341,149 B1
(45) Date of Patent: Jan. 22, 2002

(54) CLOCK CONTROL DEVICE FOR A NON-DISRUPTIVE BACKUP CLOCK SWITCHING

(75) Inventors: Lucien Bertacchini, Nice; Michel Chicherio; Jacques Fieschi, both of St. Laurent Du Var; Jean-Francois Le Pennec, Nice, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/083,925

(22) Filed: May 22, 1998

(30) Foreign Application Priority Data

Jun. 27, 1997 (EP) ............................................. 97480022

(51) Int. Cl.$^7$ ................................................ H04L 7/00
(52) U.S. Cl. ........................ 375/356; 375/373; 327/292
(58) Field of Search ................................. 375/354, 356, 375/357, 371, 373, 375, 376; 370/503, 516; 327/141, 147, 156, 291, 292, 293, 295

(56) References Cited

U.S. PATENT DOCUMENTS

| 4,239,982 A | * | 12/1980 | Smith et al. | |
| 4,653,054 A | * | 3/1987 | Liu et al. | |
| 5,638,410 A | * | 6/1997 | Kuddes | 375/357 |
| 5,642,069 A | * | 6/1997 | Waite | 327/292 |
| 5,726,607 A | * | 3/1998 | Brede et al. | 331/2 |
| 5,748,569 A | * | 5/1998 | Teodorescu et al. | 368/118 |
| 5,886,557 A | * | 3/1999 | Wilcox | 327/292 |
| 6,107,855 A | * | 8/2000 | Wilcox | 327/295 |

* cited by examiner

Primary Examiner—Jean Corrielus
(74) Attorney, Agent, or Firm—Scott W. Reid

(57) ABSTRACT

A clock control system in a network switching node including an internal reference clock of a low level Stratum and receiving a plurality of high level Stratum clocks (CLOCK 1, CLOCK 2, CLOCK n) from connection lines, one of these high level Stratum clocks being currently used to generate a Master Clock; the device selecting another high level Stratum clock when the clock currently used to generate the Master Clock fails and comprising for each high level Stratum clock, means (12, 16, 20) for phase locking the reference clock on the selected high level Stratum clock and obtaining a plurality of phase locked (PLL) reference clocks (SOURCE 1, SOURCE 2, SOURCE n). Phase alignment means (24, 26, 28) are associated with each PLL reference clock for continuously aligning its phase on the phase of the Master Clock if this PLL reference clock is not the one currently used to generate the Master Clock, whereby the Master Clock keeps on being generated without loss of data when the clock currently used to generate the Master Clock happens to fail.

8 Claims, 3 Drawing Sheets

US 6,341,149 B1

CLOCK CONTROL DEVICE FOR A NON-DISRUPTIVE BACKUP CLOCK SWITCHING

TECHNICAL FIELD

The present invention relates generally to the clock generation in a switching node of a network such as a Wide Access Network (WAN), and particularly to a clock control device used in such a node for obtaining non-disruptive backup clock switching when the master clock fails.

BACKGROUND OF THE INVENTION

A WAN is composed of nodes connected by lines which may carry a clock originating from a source clock, also called reference clock, and having various characteristics, such as rate and quality (including jitter, short term and long term stability). The clock quality is often referenced to criteria such as the Stratum model which determines several values : Stratum 0, Stratum 1, Stratum 2. . . the first defining the best quality. Thus, primary time standard clocks are Stratum 0. If a clock is continuously synchronized to a Stratum 0 server, the clock is then a Stratum 1,which is generally found on networks such as ISDN networks. In turn a Stratum 2 clock is synchronized to a Stratum 1 and so forth.

The lines connected to a node may have different speed and different quality, and may be not synchronous. Some lines may be without clock with the necessity for the node to provide the clock with the correct frequency and characteristics on this line. Another line may have a common clock for transmit and receive sides (e.g. X.21) or separate clocks (e.g. V.35). In other cases, the node may have use of a transmit clock but need to provide a receive clock.

Although nodes are generally able to generate a clock by using an internal oscillator, such a clock has Stratum level which is lower than the level available on the Public Switched Network (such as PTT) or some public equipment such as a PBX. In other words, the quality of such a clock would not normally allow it to be used as a master clock for the node.

Accordingly, the master clock of is node is normally generated using a high quality clock received on a line. But any such clock may fail. To deal with the possibility of such a failure, the node maintains a list, ordered by priority, of the clocks to be used in the event of unavailability of higher priority clocks. In addition, a node must have a mechanism able to switch from one clock to another one in order to generate all the clocks needed in the node.

What is done generally is the following. First a mechanism is installed on each line to check the presence and quality of the clock. This checking is continuous in order to allow a dynamic backup switching to another clock. Once a clock is selected, another function called the clock module, establishes a Phase Lock Loop (PLL) with respect to the reference. This mechanism is required as the source clocks don't have the same speed and an intermediate clock having always the same frequency should be phased locked in order to generate all the clocks within the node. So, the phase locked clock, the master clock of the node, is replicated at different rates and distributed to all interfaces requiring clocking.

When a failure occurs, the mechanism which checks the presence and quality of the clock used to generate the master clock informs the control and priority mechanism to switch to the highest priority available clock in the defined list. The clock is then switched in input to the PLL and all the mechanisms re-synchronize on the new clock. Unfortunately, the switching is not immediate. When the switching to the new clock is achieved, significant jitter may be introduced, resulting in data loss in different parts of the node and introducing communication errors during a short period. As the quality of a backup clock is lower than the quality of the previous-used clock, more bit errors may occur until a necessary maintenance operation can be performed where the clock can be switched without any problem.

SUMMARY OF THE INVENTION

Accordingly, a main object of the invention is to provide a clock control mechanism able to continuously generate the master clock used in a node without loss of data when the clock currently used to generate the master clock happens to fail.

The invention relates to a clock control device in a switching node of a network connected to other network nodes and to data terminal equipments by a number of connection lines. The node includes an internal low Stratum level reference clock and receives a one or more high Stratum level clocks over one or more of the connection lines. One of these high Stratum level clocks is normally used to generate a Master Clock for the node. The clock control device is used to select a different one of the plurality of high level Stratum clocks when the clock currently used to generate the Master Clock fails. For each high level Stratum clock, the clock control device includes a phase lock circuit for phase locking the reference clock on the selected clock and obtaining a plurality of phase reference clocks. Phase alignment circuits are associated with each of the phase locked reference clocks for continuously aligning its phase on the phase of the Master Clock if this phase locked reference clock is not the one currently used to generate the Master Clock, whereby the Master Clock keeps on being generated without loss of data when the clock currently used to generate the Master Clock happens to fail.

BRIEF DESCRIPTION OF THE DRAWINGS

The objects, characteristics and advantages of the invention will become apparent from the following description given with reference to the accompanying drawings wherein.

DETAILED DESCRIPTION OF THE INVENTION

Figure 1:
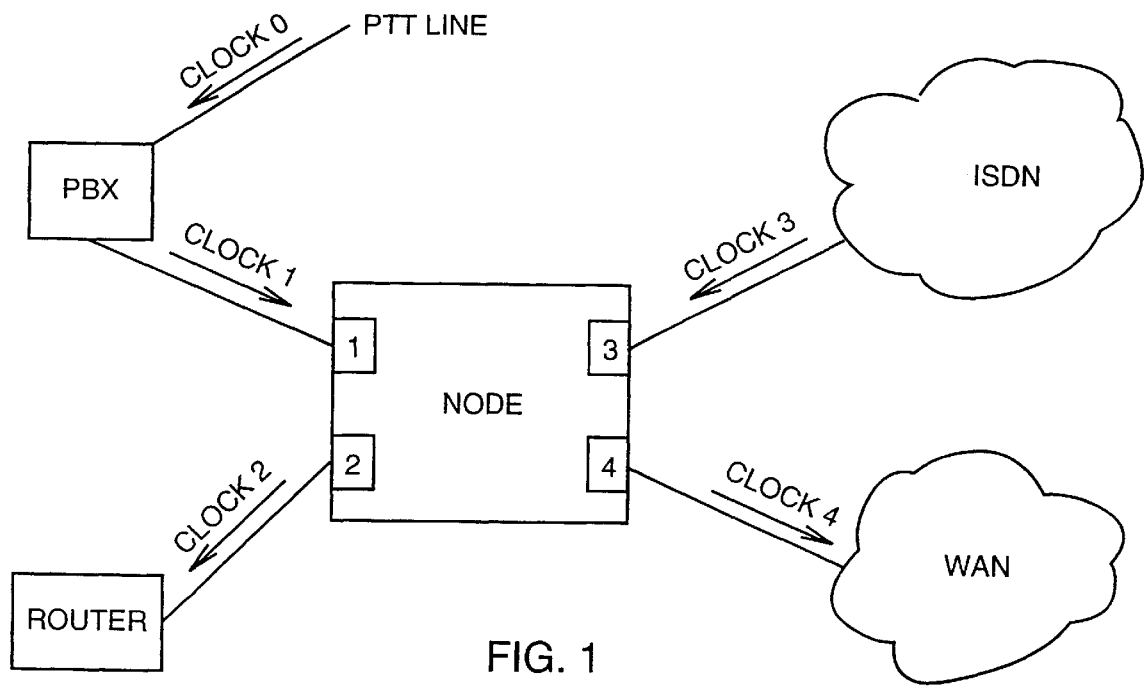
FIG. 1 is an overview of a node using different clocks for transmitting and receiving data on different connection lines.

As illustrated in FIG. 1, a node in which the invention is implemented can be connected to various connection lines associated to different transmit or receive clocks. Clock 1 represents an external clock on a DCE port when the DTE connected (a PBX) is itself clocked externally by another line such as a PTT line (through clock 0). Clock 2 represents an internal clock on a DCE port connected to a router as DTE. Clock 3 represents an external clock on a DTE trunk connected to an ISDN network. Clock 4 represents an internal clock on a DTE trunk connected to a WAN network.

The master clock of the node can derived from either clock 1 or clock 3. It is assumed that these two clocks are of the same quality; that is, are plesiochronous. Clock 1 may be defined as priority ONE, and clock 2 as priority TWO. If both clocks fail, a clock internal to the node will be used. It must be noted that, even if the two clocks are plesiochronous, the phase and the rate are probably different and the operation of switching from one of these clocks to the other does not provide transparent backup clock switching without a control device according to the invention.

Figure 2:
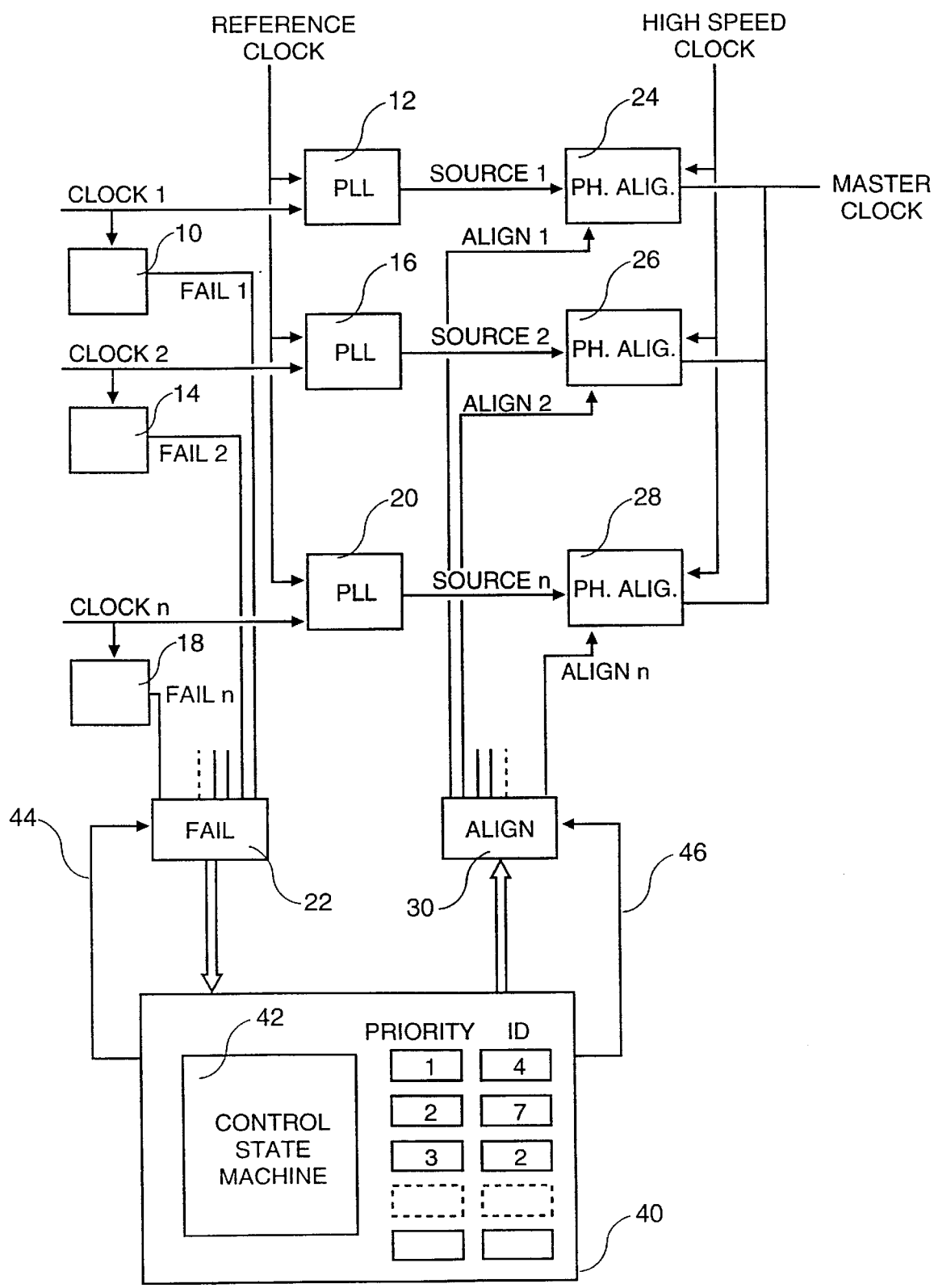
FIG. 2 is a block-diagram representing a preferred embodiment of the clock control device according to the invention.

A preferred embodiment of the clock control device according to the invention is illustrated in FIG. 2. This device operates with any number n of input clocks that may be used as source clocks for the node.

Each clock 1 to n provides an input to two devices : a failure detect logic circuit which checks for the presence and the quality of one of the clock inputs and a Phase Lock Loop (PLL) circuit which can lock the reference clock of the node to the selected input clock. Thus, clock 1 is applied to failure detect logic circuit 10 and PLL 12, clock 2 is applied to failure detect logic circuit 14 and PLL 16, while clock n is represented as being applied to a failure detect logic circuit 18 and PLL 20.

The reference or internal clock of the node is derived from a high speed clock which is generated by a crystal oscillator in the node. For example, the reference clock may have a frequency of 2 MHz obtained by a frequency division of a 40 MHz high speed clock. The high speed clock as well as the reference clock are of a low quality, for example Stratum 3 or 4.

Each failure detect logic circuit provides a signal FAIL 1, FAIL 2 . . . or FAIL n, which is raised if the corresponding clock does not meet the criteria required for it to be used as a master clock. The signals FAIL 1, FAIL 2 . . . FAIL n are used as parallel inputs to a FAIL register 22.

Each PLL device provides a source clock which has the same frequency as the reference clock frequency but with edges which are in phase with the corresponding input clock. Thus, PLL 12 associated to clock 1 provides SOURCE 1 clock, PLL 16 associated to clock 2 provides SOURCE 2 clock and PLL 20 associated to clock n provides SOURCE n clock.

Each source clock is used as input to a phase alignment mechanism that allows the source clock to follow the phase of the MASTER CLOCK which is one of them as described herebelow. Thus SOURCE 1 from clock 1 is input to phase alignment device 24, SOURCE 2 from clock 2 is input to phase alignment device 26 and SOURCE n from clock n is input to phase alignment device 28. The phase alignment devices also receive as inputs the node's high speed internal clock and signals provided in parallel by an ALIGN register 30. It must be noted that only one of the latter signals is set to one whereas the other signals are all set to zero.

Figure 3:
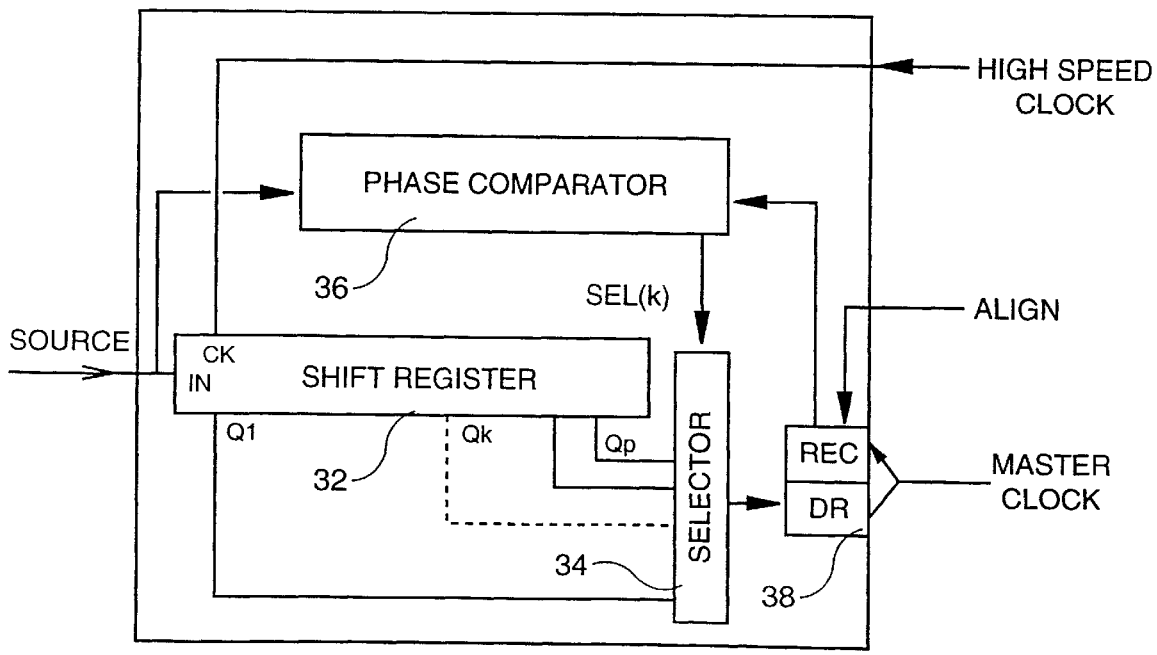
FIG. 3 is a block-diagram representing the phase alignment mechanism used in the clock control device illustrated in FIG. 2.

The phase alignment devices 24, 26 or 28,illustrated in more detail in FIG. 3, each includes a shift register 32 clocked by the nodes' high speed internal clock. The input to shift register 32 is one of signals SOURCE 1, SOURCE 2 . . . or SOURCE n. The output of shift register 32 is one of the register stage outputs Q1 to Qp selected by selector 34, the integer p being the number of pulses of the high speed clock occurring during a period of the SOURCE signal. The register stage selection is achieved by a comparator 36 in the following manner. Phase comparator 36 continuously compares the rising edges of the SOURCE signal corresponding to the selected input clock and of the signal MASTER CLOCK provided by the active phase alignment device and received by the receiver section of a tri-state driver/receiver 38. The output of phase comparator 36 is a signal SEL (k) where integer k has the value 1 to p. Such a value corresponds to the number of high speed clock pulses separating rising edges of signals SOURCE and MASTER CLOCK. Thus, with a reference clock operating at a frequency of 2 MHz and a high speed clock operating at a frequency of 40 MHz, the value of p is 20 and k can have a value between 1 and 20. Signal SEL(k) controls selector 34 allowing it to select the output Qk which is one of the shift register latches. Therefore, the correct phase value of each inactive source clock (a clock not currently being used for generating MASTER CLOCK) is continuously selected.

When the input signal ALIGN is active (its value is 1), the output of selector 34 is provided to the driver of tri-state driver/receiver 38. This means that the source clock currently used to generate MASTER CLOCK has failed and that MASTER CLOCK is now generated from the new source clock for which the signal ALIGN is set to 1. It must be noted that, from the moment the source clock is selected as MASTER CLOCK, phase comparator 36 should be inhibited to prevent any phase shift.

Coming back to FIG. 2, the contents of FAIL register 22 including signals FAIL 1, FAIL 2 . . . FAIL n are used by a processor 40 to generate signals ALIGN to be loaded in ALIGN register 30. For this, the FAIL register contents are transferred as inputs to a Control State Machine 42 when processor 40 raises the Read and Chip Select line 44.

Control State Machine 42 has to know the priority list of the clocks. This priority is assigned during node configuration to each CLOCK and is stored in a table in processor 40 as illustrated in FIG. 2. Thus, the clock assigned priority 1 is clock number 4 (ID=4), the clock assigned priority 2 is clock number 7, and so on.

The clock with the highest assigned priority is the first to be tried as a backup clock. If the FAIL signal corresponding to this clock is active, the clock with the next lower assigned priority is tried, and so on. To associate the signal FAIL to the priority, a term FAIL ID(Pj) is defined as the FAIL signal associated with the identification number of a clock having the priority j. Therefore, the function to apply to the state machine for determining the identification number SELECT of the selected PLL reference clock is:

$$\text{SELECT} = \sum_{j=1}^{n} \overline{[\text{FAIL ID}(Pj)]} * \text{ID}(Pj) * \prod_{i=1}^{j-1} [\text{FAIL ID}(Pi)]$$

wherein FAIL has only two values: 1 when the corresponding clock is not selected because it has failed or the quality criteria required by FAIL DETECT are not met and 0 when the clock is active. This rule applies to FAIL but with the reverse values. Another rule is that, when j=1, the product term TT has value 1.

The above function always selects the valid clock having the highest priority. SELECT indicates the identification number ID(Pj) of the selected clock. The corresponding bit in ALIGN register 30 is set to 1 whereas all other bits are reset to 0, and the backup clock replaces the failing clock transparently as described above.

Figure 4:
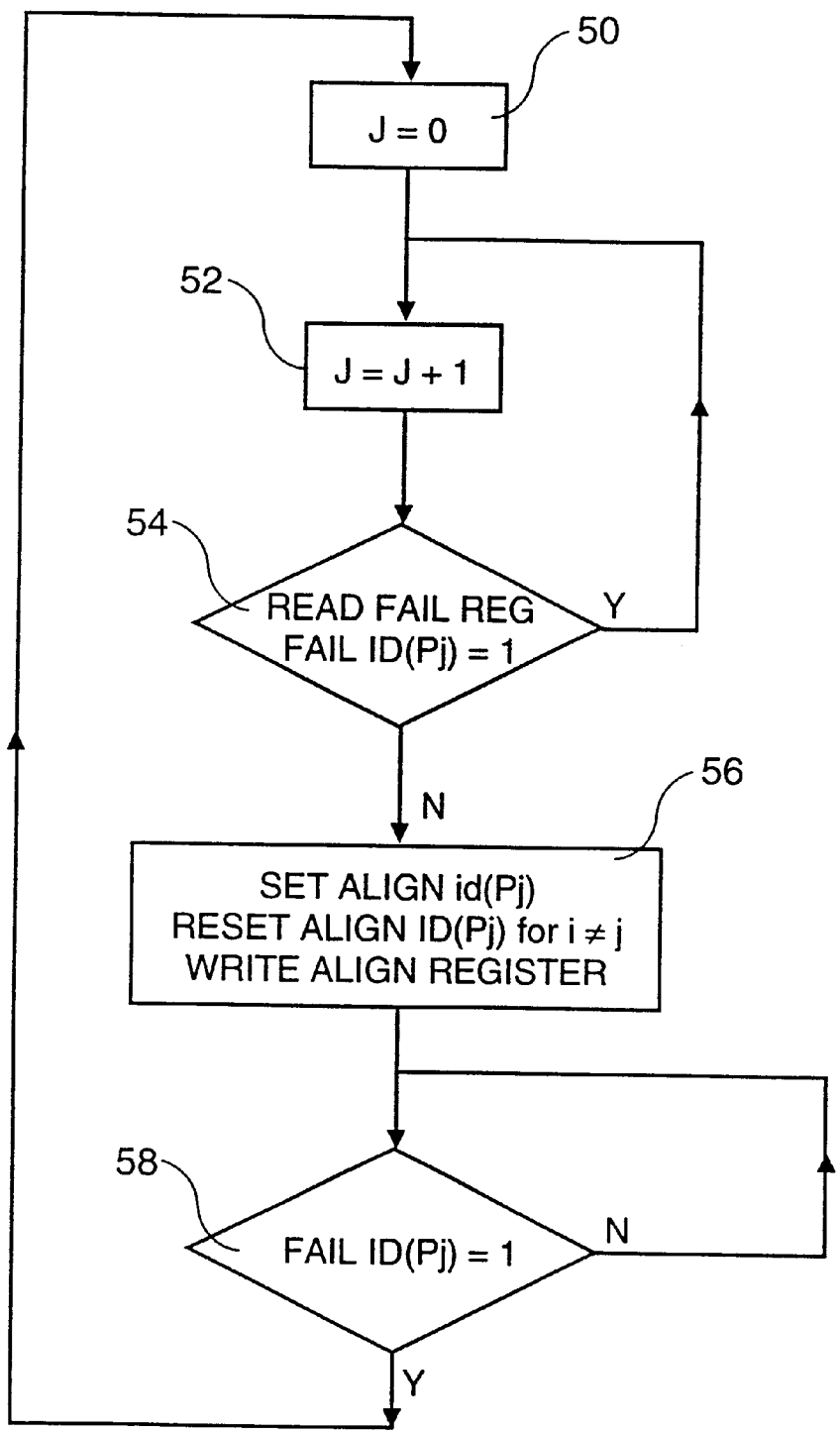
FIG. 4 is a flow chart of the control state machine used in the clock control device illustrated in FIG. 2.

An alternative to the Control State Machine is to run the process defined by FIG. 4. The variable j is initially reset to 0 at step 50 before being incremented at step 52. Then, FAIL register 22 is read at step 54. If FAIL ID(PI)=1, this means the clock with priority 1 is unusable. The program loops again to step 52 (j=j+1) and FAIL register 22 is read again with j=2 (it may have changed) and the test of step 54 occurs again and so on.

If FAIL ID(Pj)=0 at step 54, this means that the clock with priority 1 can be used as backup clock. In such a case, ALIGN ID(Pj) is set to 1 at step 56 and all other ALIGN values are reset to 0. At the same time, ALIGN register 30 is written when processor 40 raises the Write and Chip Select line 46.

Then, the program goes to step 58 where it loops on the checking of signal FAIL ID(Pj) as long as the value of this signal keeps on being 0. This may be done by a polling of FAIL register 22 or thru an interrupt generated by a change in the FAIL register.

When a failure occurs for the active clock having priority j, FAIL ID(Pj)=1 and the program loops back to the beginning with j being reset to 0 at step 50 and so on.

There has been described what are considered to be preferred embodiments of the invention. Variations and modifications to those embodiments will occur to those skilled in the art. Therefore, it is intended that the appended claims shall be construed to include both the preferred embodiments and all variations and modifications that fall within the true spirit and scope of the invention.

What is claimed is:

1. A clock control system for use in a switching node of a network connected to other network nodes and to data terminal equipments by a number of connection lines, the node including an internal reference clock of a low level stratum and receiving a plurality of high level stratum clocks over a plurality of said connection lines, one of said high level stratum clocks being used to generate a master clock for the node, said clock control system being used to select another one of said plurality of high level stratum clocks when the clock currently used to generate the master clock fails and including for each one of said plurality of high level stratum clocks:

a phase locked loop circuit for phase locking the internal reference clock to the selected clock and obtaining a plurality of phase locked (PLL) reference clocks; and phase alignment logic circuits associated with each of said PLL reference clocks for continuously aligning the phase of each of said PLL reference clocks to the phase of said master clock if the PLL reference clock is not the one currently used to generate said master clock, whereby said master clock continues to be generated without loss of data if the clock currently used to generate said master clock happens to fail.

2. A clock control system according to claim 1, wherein said phase alignment logic circuits each includes:

a phase comparator for comparing the phase of the associated PLL reference clock with the phase of the master clock, a shift register receiving said associated PLL reference clock as an input and being clocked by pulses of a high speed clock for providing outputs (Q1 to Qp) corresponding to p stages of said shift register with integer p being the number of pulses of said high speed clock occurring during a period of said PLL reference clock, and a selector for selecting one of said shift register outputs in response to the comparison of said PLL reference clock phase with said master clock phase by said phase comparator.

3. A clock control system according to claim 2, wherein each phase alignment logic circuit further comprises:

a tri-state driver/receiver circuit connected to the master clock line for providing said master clock to said phase comparator, and a control circuit for connecting said selector (34) to the driver of said tri-state driver/receiver when the PLL reference clock currently used to generate said master clock has failed and said associated PLL reference clock has been selected to generate said master clock.

4. A clock control system according to claim 3, further comprising a processor for determining which one of said PLL reference clocks is to be selected for the generation of the master clock when the PLL reference clock currently used to generate said master clock has failed and for sending an enable signal to the phase alignment logic circuit associated with said PLL reference clock.

5. A clock control system according to claim 4, further comprising a failure detecting logic circuit associated with each of said plurality of high level stratum clocks for determining whether each one of said plurality of high level stratum clocks is available and can be selected to be used as a PLL reference clock.

6. A clock control system according to claim 5, wherein the failure detecting logic circuits provide binary signals defining the high level stratum clocks which can be selected to be used as PLL reference clocks, and said processor includes select logic for determining the PLL reference clock to be selected in response to said binary signals and to a priority list giving the identification number of said PLL reference clock and an associated assigned priority.

7. A clock control system according to claim 6, wherein said select logic is a control state machine which determines the identification number of the PLL reference clock to be selected by using the function:

$$\text{SELECT} = \sum_{j=1}^{n} \overline{[\text{FAIL ID}(Pj)]} * \text{ID}(Pj) * \prod_{i=1}^{j-1} [\text{FAIL ID}(Pi)]$$

in which ID(Pj) indicates the identification number of said PLL reference clock which has a priority j.

8. A clock control system according to claim 6, wherein said select logic is implemented in the form of a computer-implemented process comprising the steps of:

a) resetting j to 0 wherein j defines the clock priority level;

b) incrementing j to j+1;

c) checking whether FAIL ID(Pj)=1 wherein ID(Pj) indicates the identification number of said PLL reference clock which has a priority j;

d) repeating steps b) and c) until FAIL ID(Pj)=0; and e) selecting the PLL reference clock having the most recently indicated identification number.

* * * * *